April 30, 1968     J. R. GRAYSON     3,380,590
WATER SOFTENER HAVING A MAIN CONTROL VALVE AND AN
AUXILIARY BRINE CONTROL VALVE
Filed Dec. 18, 1964     2 Sheets-Sheet 2

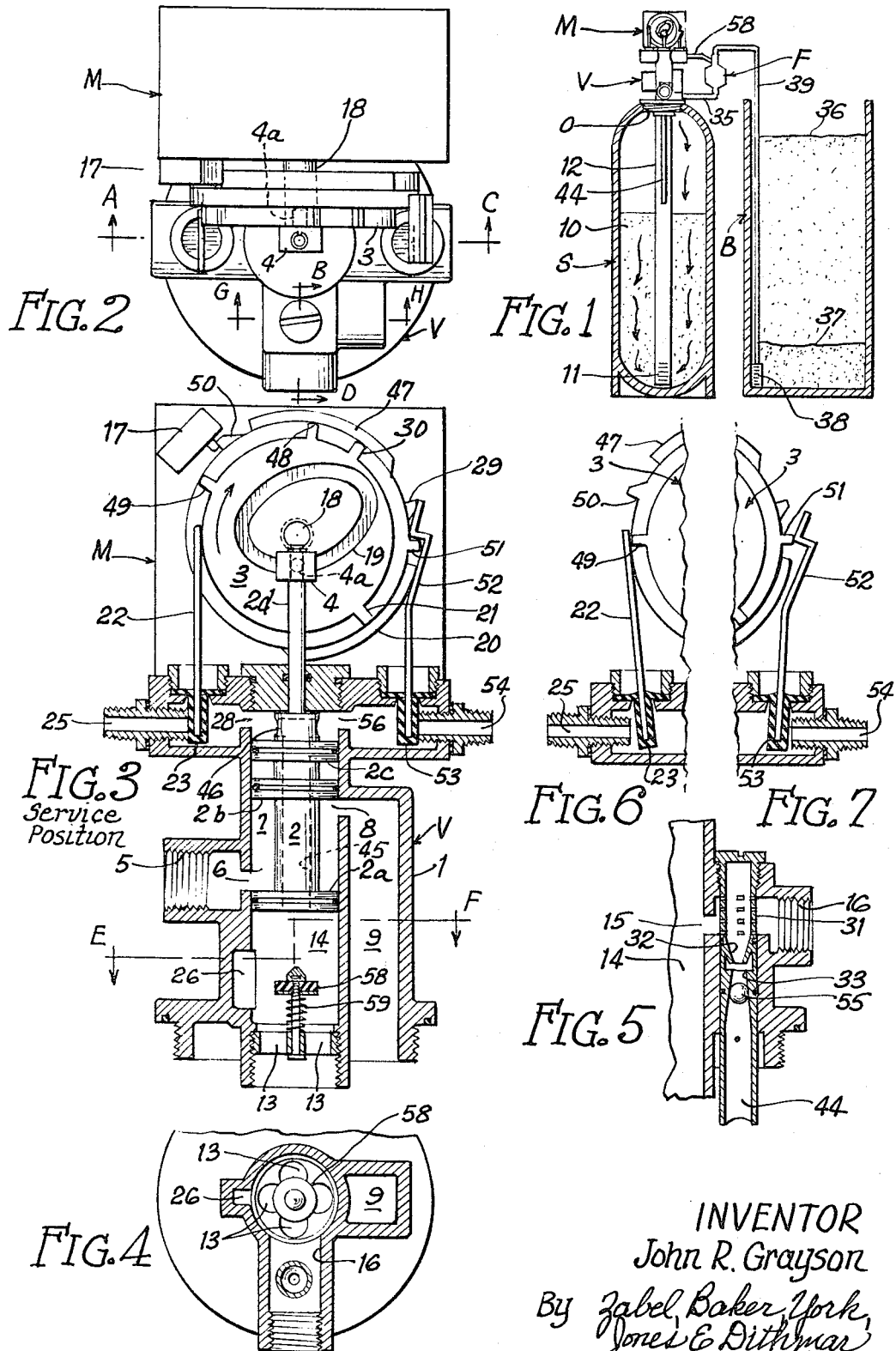

Backwash Position

Brine and Slow Rinse Position

United States Patent Office 3,380,590
Patented Apr. 30, 1968

3,380,590
WATER SOFTENER HAVING A MAIN CONTROL VALVE AND AN AUXILIARY BRINE CONTROL VALVE
John R. Grayson, Arlington Heights, Ill.
(1950 E. Estes Ave., Elk Grove Village, Ill. 60007)
Filed Dec. 18, 1964, Ser. No. 419,488
10 Claims. (Cl. 210—134)

ABSTRACT OF THE DISCLOSURE

A water softening system having a main, timed, cam actuated, piston-type control valve comprising cam actuated drain and refill valves, and having an auxiliary brine control valve, the water softening system being constructed to perform treatment operation, primary backwash and simultaneous additional backwash operation, settling operation, brining operation, soaking operation, slow and fast rinsing operation and brine tank refill operation.

---

This invention relates to liquid treating apparatus and component control valves which in certain respects characterize the apparatus invention.

For convenience, the apparatus and component control valves will be illustrated and described in connection with water softening equipment, particularly equipment using the zeolite method of water softening. It is to be understood, however, that the apparatus and component valves may be used in other liquid treating equipment, and that reference herein to water softening equipment is by way of example and not of limitation.

One object of the invention is to provide liquid treating apparatus that in operation functions in a superior and more efficient manner than prior apparatus of the same general type.

Another object is to provide liquid treating apparatus that in preferred form avoids the use of valve-actuating solenoids, which require periodic maintenance and at best are a source of difficulty.

Another object is to provide a brine-making system that eliminates the use of float valves, grid shelf systems, and the like, which are expensive to manufacture and often difficult to maintain in working order. The present system provides highly improved control over the amount of brine used.

As is well known in the art, two types of brine-making systems are commonly used, known conveniently as the "wet salt" and the "dry salt" systems. In the wet salt systems, the brine tank is about half filled with salt, and the water level is controlled so that it fills the brine tank almost to the top. This system has the following disadvantages: To accurately measure the brine, the top portion may not be filled with salt, thereby wasting space in the tank and requiring a larger tank for a given capacity of salt; a capillary action takes place on the sides of the container so that salt crystals form one upon another and "salt creep" takes place, the crystals often creeping up and over the top of the brine tank, thus creating a disagreeable appearing and corrosive condition; and, in order to refill the brine tank, the water level must first be lowered in order to add salt, thus wasting brine and adding to the time required for the operation.

One "dry salt" system employs a perforated shelf or grid supported some distance above the floor of the brine tank. The height of the water filling the brine tank is controlled so that its level is slightly over the level of the grid. The salt is supported on the grid, the lower portion of the salt being submerged. This system has the following disadvantages: It is difficult to adjust the amount of brine, since some mechanical manipulation is necessary with a float valve; space is wasted, since area must be provided for the grid and supports, thereby requiring a larger tank for a given capacity of salt; and the grid is costly.

Another "dry salt" system dispenses with the grid, and in this system the salt rests on the floor of the brine tank. A float valve controls and establishes the upper water level, and when brine is used, the level is lowered to within a few inches above the floor. This system eliminates certain disadvantages of the grid system, but in addition to the difficulty of brine-use adjustment, this system also makes it difficult to refill the brine tank with salt, and wastes brine.

A "timed brine tank refill" system, provided simply and economically by this invention, eliminates the disadvantages of previous systems. No space is wasted in the brine tank, as the water refill merely fills the voids in and around the granules of salt. It is not difficult to refill the brine tank, and salt can be added at any time without danger of overflowing the brine tank or creating a waste of brine. In addition, use of a costly grid is avoided. This system also eliminates "salt creep." It also provided for an accurate control of the amount of brine made, and provides that the brine is made with soft water.

Another object of the invention is to provide a simplified control valve that has a minimum of operating parts and thus is economical to manufacture and use, and yet can perform a multiplicity of functions so as to treat a variety of difficult waters.

Still another object is to provide a control valve that is easily assembled with the remaining components of the liquid treating apparatus. All conduits used in the apparatus either are connected to the valve itself, or form an integral part of the valve. In addition, the valve of the invention is suited for use as a replacement valve in existing liquid treating equipment.

Another object is to provide a control valve that has a self-cleaning characteristic. The valve is substantially trouble-free, and subject to easy disassembly when occasion arises.

Another object of the invention is to provide a valve wherein the drain control is independently operated relative to the main flow control. Thus, the drain control can be closed prior to movement of the main flow control, thereby minimizing strain and tearing of the sealing means, and eliminating the noises, surges, knocks and whistles that ordinarily characterize valves in which the flow of water is rapidly changed from one direction to another.

Another object of the invention is to provide a valve that is actuated by operating cams which can be altered so that the valve may, if desired, perform a variety of regenerating functions. The independently operated drain control mentioned above contributes to the versatility of the valve.

A feature of the invention contemplates that the softening chemical can be allowed to settle following the step of backwashing. Thus, when the brine is introduced, the chemical will be in a compacted state, and the brining will will be more efficient.

Another object is that the brine or other reconditioning material will be introduced in the region immediately adjacent to the upper portion of the chemical, thereby insuring as much as possible that the brine will be substantially undiluted when initially engaging the chemical. The flow of reconditioning material is downwardly through the chemical.

Another object is that the brine, after being introduced into the chemical, can remain undisturbed, or "soak," for a period of time, thereby further increasing the ion exchange efficiency.

Another object is to provide a control valve that operates to rinse the chemical downwardly at a fast flow rate, following a complete slow rinse, so as positively to flush all brine from the chemical, settle and compact the chemical and flush any remaining foreign matter from the bed so that the initial effluent from the softener shall be crystal-clear.

Other objects, advantages and details of the invention will be apparent as the description proceeds, reference being had to the accompanying drawings wherein one form of the invention is shown. As mentioned, the illustrated form involves water softening equipment and associated control valves designed particularly for such equipment. It will be understood, however, that the description and drawings are illustrative only, and that the scope of the invention is to be measured by the appended claims which are to be construed broadly in favor of liquid treating apparatus generally.

In the drawings:

FIG. 1 is a somewhat diagrammatic sectional view on reduced scale of water softening apparatus embodying the invention.

FIG. 2 is a top plan view of a control valve of the invention.

FIG. 3 is a longitudinal sectional view of the valve on line A-C of FIG. 2, the movable valve parts shown in service or softening position;

FIG. 4 is a fragmentary transverse sectional view on line E-F of FIG. 3.

FIG. 5 is a fragmentary sectional view on a portion of line B-D of FIG. 2, the floating ball shown in repose.

FIG. 6 is a fragmentary sectional view on a portion of line A-C of FIG. 2, the illustrated movable valve shown in open position.

FIG. 7 is a fragmentary sectional view on a portion of line A-C of FIG. 2, the illustrated movable valve shown in open position.

Figure 8:
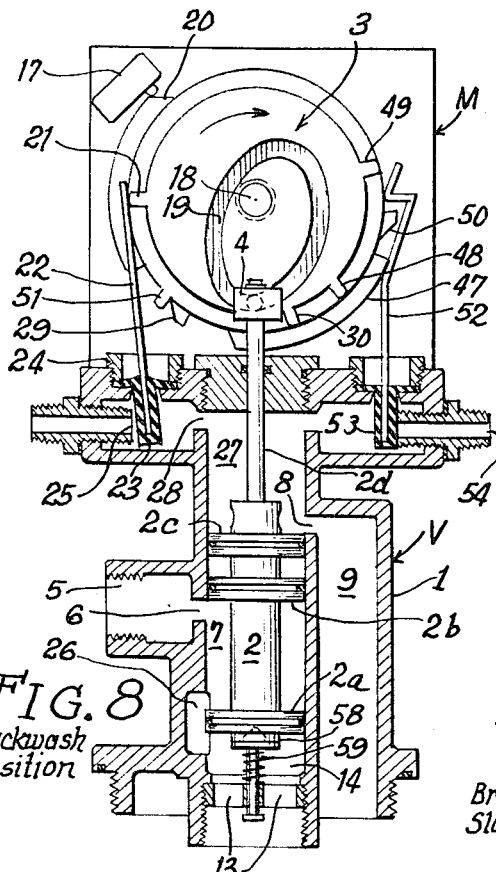
FIG. 8 is a longitudinal sectional view of the valve on line A-C of FIG. 2, the movable parts shown in backwashing position.

Referring first to FIG. 1, the major components of the illustrated water softening apparatus are softener tank S, brine tank B, control valve V, auxiliary fluid control valve F and motor M. Softener tank S has an opening O of substantial size in the upper portion. Control valve V is mounted on the tank within the opening in sealing manner.

Not shown is the control timer, which may be remotely mounted if desired, the essential connections to motor M being electrical. The timer may be a simple clock type timer of conventional character able to close and open in sequence at set times switches connected in electrical circuits that will be described later.

Control valve V (FIGS. 2-10) includes a valve housing 1 having an internal chamber comprising several communicating portions that will be mentioned individually hereinafter. Valve V also includes a movable valve piston 2 having three sections, 2a, 2b, and 2c, and the shaft 2d extending to the exterior of the valve, means for moving piston 2 to each of three different axial positions, here shown as cam 3 and follow block 4, eductor 32 (FIGS. 5, 9 and 10), drain valve 23 (FIGS. 3, 6, 8 and 9), and brine tank refill valve 53 (FIGS. 3, 7, 8 and 9).

For convenience and brevity, it is believed that the remaining parts and details of the apparatus and valve may be described adequately while simultaneously describing the operation of the apparatus and the valve. Such simplified description follows.

Service or softening operation

FIGS. 1 and 3 illustrate the apparatus and control valve V during operation of the equipment for softening water, i.e. the movable parts of control valve V are in service or softening position. Untreated or hard water enters valve V through hard water inlet port 5 (FIG. 3). It travels through passage 6 to chamber 7, thence through hard water outlet port 8 to passage 9, and thence to the interior of softener tank S (FIG. 1). At this time piston 2 is in its upper position, and piston sections 2a and 2b cooperate to define chamber 7 and establish direct connection between ports 6 and 8.

Referring to FIG. 1, the untreated or hard water admitted to the interior of softener tank S through hard water outlet port 8 and passage 9 flows downwardly in the tank through softening chamical 10, during which time the water is softened and filtered in well known manner. The treated water at the bottom of tank S flows through strainer 11 and upwardly through drop tube 12 to valve V.

Referring again to FIG. 3, the treated water flowing upwardly through drop tube 12 goes through soft water inlet port 13 and enters chamber 14. Thence the water flows through port 15 (FIG. 5) and soft water outlet port 16 to the service distribution system (not shown).

Drop tube 12 hereinafter sometimes is referred to as first conduit means extending between the valve and the lower portion of the interior of the softener tank.

When chemical 10 requires regeneration, a timer (not shown) in response to manual or clock control, actuates switches which energize a primary circuit through switch 17 (FIGS. 2, 3, 8 and 9) to motor M. Cam 3 (FIGS. 2, 3, 6, 7, 8 and 9) is rotated by shaft 18 in a clockwise direction. As cam 3 turns, follow block 4 and pin 4a (FIGS. 2 and 3) in track 19 are forced downwardly to the backwash position (FIG. 8). At this point, cam 20 (which is a part of cam 3) engages swtich 17, breaking the primary circuit to motor M, whereby motor M stops its rotation in this position. Also, at this time, a secondary circuit of switch 17 is closed, which will be utilized during the next movement.

Simultaneously with moving piston 2 to its lower position, cam 21, also a part of cam 3, has engaged lever 22 (FIG. 8) which acts to push drain valve 23 away from drain port 25, beginning the backwash.

Backwash operation

Still referring to FIG. 8, incoming hard water flows into hard water inlet port 5, through passage 6 into chamber 7, thence down past the reduced central portion of piston 2, around section 2a through backwash port 26 (FIGS. 8 and 4) into chamber 14 through port 13 into drop tube 12 (FIG. 1). Axial passageway 45 (FIGS. 3 and 9) in piston 2 is sealed by the seating of valve 58 against the bottom of piston section 2a, compressing bias spring 59.

It should be noted here that any foreign matter that has accumulated in chamber 7 of the valve during the softening operation is flushed into drop tube 12 during backwashing. Also, hard water from chamber 7 is available to port 15 (FIGS. 5 and 9) and soft water outlet port 16, whereby water may be drawn from the service system if desired.

During backwashing, hard water flows downwardly through drop tube 12, out through strainer 11 (FIG. 1)

and into the lower part of chemical 10. The water then flows upwardly through chemical 10, flushing accumulated dirt up and out. At the top of tank S the water and foreign matter flow into valve V through hard water outlet passage 9 and port 8, thence into chamber 27 (FIG. 8) and through port 28 to then-open drain port 25.

It is well known that during the service operation of a water softener the softening chemical or mineral bed also acts as a filter. During conventional backwashing, water enters at the bottom of the mineral bed and passes up through the entire bed, flushing away the particles of foreign matter that have been filtered out and deposited throughout the mineral bed.

It has been determined in connection with this invention that the dirt on the top of the mineral bed can be flushed out of the tank better if an additional backwash is provided near the top of the mineral when the mineral is expanded or fluffed during the backwash operation. This additional backwash, or "backwash booster," introduces a second level of backwashing into the mineral bed at the point of greatest need, that is, near the top of the bed.

The way this is accomplished is as follows: During the backwashing step the flow takes place as previously described. In addition, flow also takes place along the folliwing path: Port 15 (FIG. 9) through screen 31 and through eductor 32 down through conduit means 44 (FIG. 1) to its lower end.

Referring again to FIG. 1, it should be borne in mind that mineral 10 is expanded during the backwashing operation so that it almost fills the entire tank S.. Therefore, the upper 25 to 30 percent of the softening mineral is above the lower end of conduit 44.

The flow of water emanating from the lower end of conduit 44 and passing upward through the mineral gives an additional flow to flush accumulated dirt out of the softener along the same path as is followed by the mainstream of flow.

When the movable valve parts are in backwash position, as shown in FIG. 8, it will be noted that lower piston head 2a cooperates to establish connection between hard water inlet port 5 and soft water inlet port 13, whereby hard water is directed downwardly through drop tube 12 for backwashing. Also, it will be noted that upper piston head 2c cooperates to establish connection between hard water outlet passage 9 and drain port 25.

Figure 9:
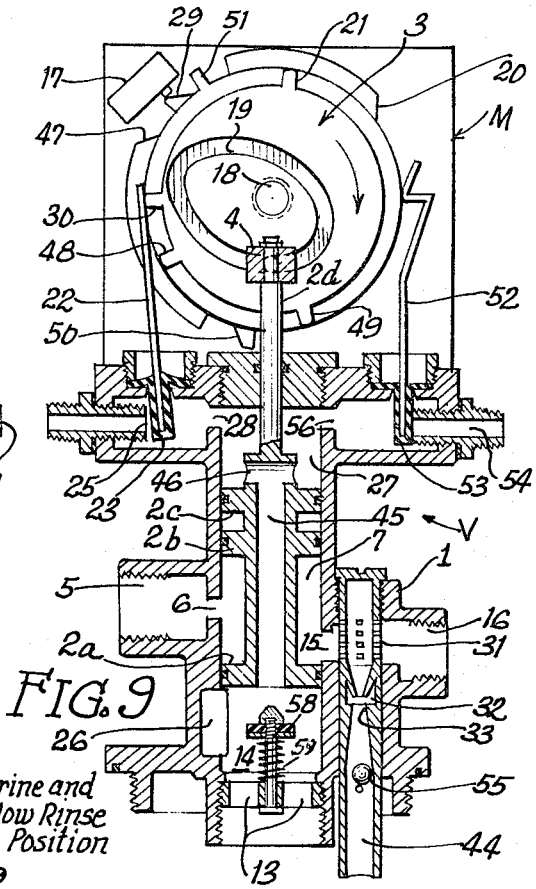
FIG. 9 is a longitudinal sectional view of the valve on line A-B-D of FIG. 2, the movable parts shown in brine and slow rinse position.
Figure 11:
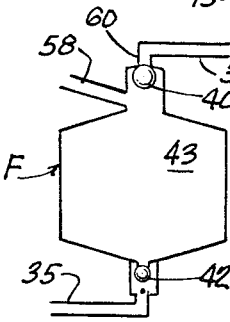
FIG. 11 is a diagrammatic longitudinal sectional view of the auxiliary fluid control valve used in the invention.

At the conclusion of predetermined backwashing time, as controlled by the timer, or manually, the secondary circuit is energized through switch 17 to once again supply current to the motor M. Motor M then rotates cam 3 so that cam 21 disengages lever 22 and the drain valve 23 closes on drain port 25. Cam 3 continues to rotate, and by means of follow block 4 and pin 4a engaging track 19, piston 2 is raised to its intermediate position, as shown in FIG. 9. At this point, switch 17 falls off cam 20, motor M stops, and the primary circuit in switch 17 is again closed in preparation for the next movement.

*Settling Operation*

In this position, there is no water flowing, and the mineral has an opportunity to settle from its fluffed, expanded backwash position, so that it may more readily accept the forthcoming brine, it being well known that the efficiency of the ion exchange process is highest when the mineral bed is compacted.

After a suitable short interval, the timer energizes the primary circuit through switch 17, causing motor M to rotate cam 3 until cam 29 engages switch 17, breaking the primary circuit to motor M, whereby motor M stops, and the secondary circuit is closed (FIG. 9). Simultaneously, cam 30 engages lever 22, opening drain port 25, and beginning the brining operation.

*Brining operation*

Figure 10:
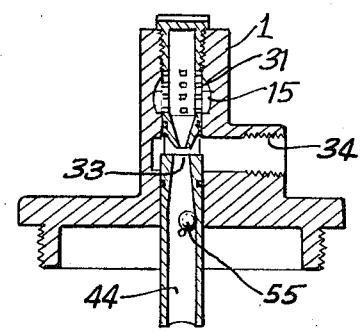
FIG. 10 is a longitudinal section through part of the valve on line G-H of FIG. 2, the floating ball shown in brine and slow rinse position.
Figure 13:
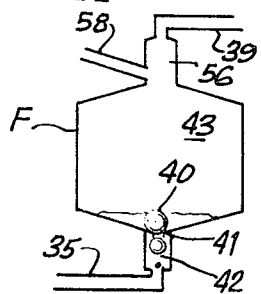
FIG. 13 is the same sectional view shown during the slow rinse portion of the regeneration cycle.
Figure 14:
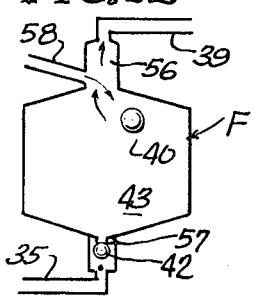
FIG. 14 is the same sectional view shown during the brine tank refill portion of the cycle.

With piston 2 in the brining position in FIG. 9, incoming hard water flows into hard water inlet port 5, through port 6 into chamber 7. The water thence flows through soft water outlet port 15 through screen 31 into eductor 32. As the water flows through eductor 32 into eductor throat 33, a low pressure or suction condition is created at brine inlet port 34 (FIG. 10). A brine conduit 35 (FIG. 1), sometimes hereinafter called a second conduit means extending between the brine inlet port and the fluid control valve F, is connected between brine inlet port 34 and fluid control valve F.

Referring to FIG. 1, brine tank B is filled with salt 36 of a granular shape, or a pressed shape such as a pellet, or block shape such as is commonly used for cattle. Water fills the voids in and around a portion of salt 36 to level 37.

The low pressure or suction condition at brine inlet port 34 is effective to cause brine to flow in brine tank B through screen 38 and conduit 39 into fluid control valve F.

Figure 12:
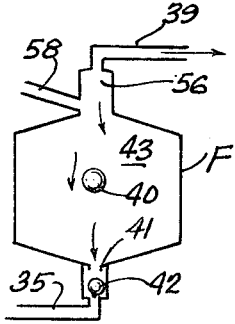
FIG. 12 is the same sectional view shown during the brining portion of the regeneration cycle.

Referring to FIG. 12, brine entering fluid control valve F from conduit 39 flows downwardly past floating balls 40 and 42 through chamber 43 and port 41 and into conduit 35, and thence to brine inlet port 34, thence through eductor throat 33 and brine outlet conduit 44 (FIGS. 9 and 10).

Conduit 44, sometimes hereinafter called third conduit means, extends between eductor throat 33 and a region adjacent to the top of chemical 10, as shown in FIG. 1. Thus, during the brining step, brine is discharged into softener just above chemical 10, and the brine is substantially undiluted when brought into contact with the chemical. This feature contributes to the high efficiency of the present apparatus.

Brine passes downwardly through chemical 10, reconditioning same, and flows through strainer 11 (FIG. 1) and upwardly through drop tube 12 into valve V through soft water inlet port 13 (FIG. 9). The brine thence flows through chamber 14 into then-open axial passage 45 in piston 2. It flows upwardly through axial passage 45, port 46, chamber 27, port 28 and outwardly through drain port 25.

During this part of the cycle, as during backwashing and settling, hard water from hard water inlet port 5 is made available to port 16, so the service system may furnish water if needed. Piston head 2a prevents brine from being drawn into the service lines.

Still referring to FIG. 9, with piston in intermediate position, it will be noted that piston heads 2b and 2a cooperate to establish connection between hard water inlet port 5 and port 15 and associated soft water outlet port 16. Also it will be noted that axial passage 45 in piston 2 cooperates to establish connection between soft water inlet port 13 and drain port 25.

When the level of brine in brine tank B is drawn down to the top of screen 38 (FIG. 1), air enters conduit 39. When air reaches chamber 43 (FIGS. 11–14) of fluid control valve F, ball 40 drops, sealing on seat 41, thereby sealing brine conduit 35 so that air is not drawn into valve V.

*Soaking operation*

Now that all of the brine has been drawn into the softener tank and is in intimate contact with chemical 10, it is desirable to allow this contact to continue uninterrupted and undisturbed for a period of time to promote ion exchange. For this purpose, the timer is now actuated to energize the secondary circuit through switch 17.

Motor M turns until switch 17 falls off cam 29, at which time the motor stops and the primary circuit of switch 17 is closed. The drain lever 22 has fallen off cam 30, and the drain valve 23 has closed on drain port 25.

After a suitable period of soaking, the timer then energizes the secondary circuit, and motor M rotates cam 3 until cam 47 engages switch 17. This breaks the primary circuit, stopping the motor, and engages the secondary circuit, preparatory for the next movement.

*Rinsing operation*

At the point where cam 47 engages switch 17, cam 48 engages drain lever 22, opening drain port 25. Incoming hard water flows into hard water inlet 5 (FIG. 9), through port 6 into chamber 7 and through port 15 and thence through strainer 31, eductor 32 and eductor throat 33, and through third conduit means 44 into the region adjacent to the top of chemical 10, this water being effective to rinse chemical 10 until it is free of brine, the rinse travelling to and through drain port 25 along the same path previously described for the brine.

After a rinse period of predetermined duration, the timer energizes the secondary circuit to motor M. Motor M rotates cam 3 and as it does so drain lever 22 falls off cam 48 thereby closing drain port 25. As motor M continues to rotate, the follow block 4 and its pin 4a in track 19 lift shaft 2d and piston 2 to its upper position.

When switch 17 falls off cam 47, the secondary circuit is broken and the motor M stops. The primary circuit is closed, and cam 3 is in the approximate position shown in FIG. 6. The piston is in the upper position shown in FIG. 3. The drain lever is engaged by cam 49, opening drain port 25.

*Fast rinse operation*

Incoming hard water flows into hard water inlet 5 (FIG. 3), through port 6 into chamber 7, through port 8 into passage 9 and thence into the top of the softener tank, as during the softening operation. This rapid flow of water down through the chemical settles and compacts the bed and flushes out all foreign matter loosened during the brining operation.

The flow then is through screen 11 and up through drop tube 12 to valve V. Thence the fast rinse passes through port 13 into chamber 14 and thence up through axial passage 45 in piston 2, out through port 46 into chamber 27 and through port 28 and outwardly through drain port 25.

After a suitable fast rinse period, the timer energizes the secondary circuit, actuating motor M to rotate cam 3 until cam 50 engages switch 17, breaking the primary circuit, stopping the motor, and closing the secondary circuit of switch 17 preparatory for the next movement. At this point, cam 3 is in the position shown in FIG. 7.

*Brine tank refill*

Cam 51 (FIG. 7) engages brine tank refill lever 52, moving valve 53 off port 54. The flow of water is the same as in the previous fast rinse operation, to and through the mineral and to chamber 27. Thence the flow is through port 56 (FIG. 3) and around valve 53 to refill port 54 (FIG. 7). It should be noted here that the brine tank is refilled with soft water. It is well known that a brine made with soft water will produce a higher and more efficient regeneration than one made with hard water. Thus, this feature contributes to the high efficiency of the apparatus.

Refill port 54 is connected with fluid control valve F by conduit 58 (FIGS. 1, 11–14), sometimes called a fourth conduit means. As water flows into valve F through its downwardly angled inlet (FIG. 14), floating ball 40 is prevented from entering chamber 56 by the force and swirling of the incoming water. Floating ball 42 prevents water from flowing in from conduit 35 by seating on seat 57. The refill water flows up and out through conduit 39 and thence to the brine tank.

After the predetermined quantity of water is metered into the brine tank, the timer actuates the secondary circuit, energizes motor M through switch 17, and rotating the cam 3 until switch 17 falls off cam 50, thereby breaking the secondary circuit and stopping the motor. The primary circuit through switch 17 is closed, preparatory for the next regeneration. Salt 36 once again is dissolved until the brine is saturated, ready for the next cycle of regeneration.

During the subsequent softening or service operation of the apparatus, any foreign matter which had been flushed into drop tube 12 during backwashing is washed out of the tube and valve in normal usage of the soft water, thereby ridding the valve and apparatus of troublesome foreign matter.

Also, any foreign matter which has been strained out of the hard water by screen 31 is washed off the screen by the soft water passing through and around it during the normal use of soft water, thereby keeping the screen continually clean without bothersome maintenance. This novel and ingenious placement of the eductor screen minimizes attention to the valve.

The placement of eductor 32 is made possible by floating ball 55, located just below the eductor throat 33. During service or softening position, ball 55 floats upwardly and seals in the tapered bottom of the eductor throat as shown in FIG. 5, thereby preventing the flow of hard water from the top of the softener tank into soft water outlet 16. However, during the brining and rinsing operations, ball 55 allows passage of water downwardly around it, as shown in FIGS. 9 and 10.

During softening or service position, floating ball 40 in valve F (FIG. 11) floats upwardly and seats against seat 60. If there is any leakage of water past ball 42 or valve 53, leakage will be prevented by ball 40 sealing on seat 60. Also, if all of the brine were not drawn from the brine tank during the previous regeneration, ball 40 will remain seated against seat 60. Then, during the brine tank refill operation, instead of assuming the position shown in FIG. 14, ball 40 will remain seated against seat 60 and will prevent adding additional water to the brine tank which possibly could cause overflow.

From the above description it is thought that the construction and advantages of this invention will be readily apparent to those skilled in the art. Various changes in detail may be made without departing from the spirit or losing the advantages of the invention.

For example, a simplified version of this cam drive arrangement could be used which would be less expensive to construct but which would be somewhat limited in its versatility. Switch 17 could be eliminated, and the motor could be set to complete one full rotation slowly, and then stop. A simpler timer then could be used which would simply initiate revolution of the motor. All intervals of the regeneration would then be fixed, determined by the design of the cam.

Auxiliary fluid control valve F is disclosed and claimed in my prior copending U.S. patent application entitled "Control Valve Responsive to Fluids of Different Densities," Ser. No. 391,628, filed Aug. 24, 1964, now Patent No. 3,363,692.

Having thus described the invention, what is claimed as new and desired to secure by Letters Patent is:

1. Liquid treating apparatus comprising:
   a treating tank partially filled with chemical;
   a control valve associated with said tank and having a raw liquid inlet port, a raw liquid outlet port leading to the interior of said tank, a treated liquid inlet port, a treated liquid outlet port, a drain port, a drain port valve, a refill port, a refill port valve, a brine inlet port, a brine outlet port, an eductor in communication with both said treated liquid outlet port and said brine inlet port, an eductor throat adjacent said eductor, a floating ball at times adapted to seal said eductor throat and an internal movable three-headed valve piston adapted successively to assume a service position, a backwash position and a brine and slow rinse position;

means for moving said valve piston to said three positions at predetermined times;

a first conduit means extending between said control valve and the lower interior portion of said treating tank;

a brine tank;

an auxiliary fluid control valve connected to said brine tank;

a second conduit means extending between said auxiliary fluid control valve and said brine inlet port;

a third conduit means extending between said eductor throat and a region adjacent the top of said chemical;

a fourth conduit means extending between said refill port and said auxiliary fluid control valve; and means for opening and closing said drain port valve and said refill port valve in independently timed relation with the positioning of said valve piston whereby said apparatus successively performs treatment operation, primary backwash operation and simultaneous additional backwash operation near the top of said chemical, settling operation, brining operation, soaking operation, slow and fast rinsing operation and brine tank refill operation.

2. The combination of claim 1 wherein said means for moving said valve piston to said three positions at predetermined times and said means for opening and closing said drain port valve and said refill port valve in timed relation with the positioning of said valve piston comprise:

a motor;

a cam driven by said motor and positioning said valve piston;

a switch connected in primary and secondary circuits with said motor;

cam means on said cam for actuating said switch and said drain port valve and said refill port valve; and timer means for energizing said primary and said secondary circuits.

3. In liquid treating apparatus, the sub-combination comprising:

a treating tank partially filled with chemical;

a control valve associated with said tank and having a valve piston, a raw liquid inlet port and a treated liquid outlet port;

a first conduit means extending between said control valve and the lower interior of said treating tank;

a third conduit means extending between said treated liquid outlet port and a region adjacent the top of said chemical;

means forming part of said control valve and including said valve piston for directing liquid from said raw liquid inlet port into said first and third conduit means providing primary and additional backwash operations throughout the same time period;

a drain port and a drain port valve in said control valve;

means maintaining said drain port valve in open position during said backwash operations;

means closing said drain port valve to terminate said backwash operations and provide a period allowing said chemical to settle and become compacted;

means effective during said period for moving said valve piston to a position for providing a brining operation on said chemical; and means opening said drain port valve to initiate said brining operation.

4. In liquid treating apparatus, a control valve comprising:

a valve housing having a raw liquid inlet port, a raw liquid outlet port, a treated liquid inlet port, a treated liquid outlet port, a drain port, a refill port, a brine inlet port, a brine outlet port, an eductor in communication with both said treated liquid outlet port and said brine inlet port and an eductor throat adjacent said eductor;

a drain port valve in effective relation with said drain port;

a refill port valve in effective relation with said refill port;

a floating ball at times effective to seal said eductor throat to prevent raw liquid from entering said eductor and said treated liquid outlet port;

a movable three-headed piston within said valve housing adapted successively to assume a service position, a backwash position and a brine and slow rinse position;

means for moving said valve piston to said three positions at predetermined times; and means for opening and closing said drain port valve and said refill port valve in independently timed relation with the positioning of said piston.

5. In liquid treating apparatus, a control valve comprising:

a valve housing having a drain port and a refill port;

a drain port valve in effective relation with said drain port;

a refill port valve in effective relation with said refill port;

a movable three-headed piston within said valve housing adapted successively to assume a service position, a backwash position and a brine and slow downflow rinse position;

means for moving said valve piston to said three positions at predetermined times; and means for opening and closing said drain port valve and said refill port valve in independently timed relation with the positioning of said piston.

6. In liquid treating apparatus, a treating tank;

a control valve associated with said tank and having a raw liquid inlet port, a treated liquid inlet port, a drain port, a drain port valve, a refill port, a refill port valve, a brine inlet port, a brine outlet port and an internal movable valve piston adapted to assume positions determinative of apparatus operations;

means for moving said valve piston to said positions at predetermined times;

a brink tank;

an auxiliary fluid control valve connected between said brine tank and said refill port and said brine inlet port, said auxiliary fluid control valve stopping flow to said brine inlet port when said brine tank is exhausted of brine and permitting the flow of refill fluid therethrough; and means for opening and closing said drain port valve and said refill port valve in independently timed relation with the positioning of said valve piston.

7. The combination of claim 6 wherein said brine tank is adapted to be filled with salt throughout, and wherein said treated liquid inlet port, said refill port valve and said means opening and closing said refill port valve cooperate to meter treated liquid into said brine tank on a timed basis.

8. The combination of claim 7 wherein said auxiliary fluid control valve includes:

means for passing brine from said brine tank to said brine inlet port and preventing the passage of air when the brine is exhausted;

means for passing treated liquid from said refill port to said brine tank; and means preventing liquid flow from said brine inlet port to said brine tank.

9. The combination of claim 8 wherein said auxiliary fluid control valve also includes means for preventing the passage of liquid from said auxiliary fluid control valve into said brine tank at any time except during operation of said means for passing treated liquid from said refill port to said brine tank.

10. The combination of claim 8 wherein said auxiliary fluid control valve also includes means preventing the passage of liquid from said refill port to said brine tank in the event said brine tank previously was not emptied of brine, thereby preventing possible overflow of said brine tank.

References Cited

UNITED STATES PATENTS

| | | | |
|---|---|---|---|
| 648,105 | 4/1900 | Greer | 210—277 X |
| 2,800,229 | 7/1957 | Spaulding | 210—190 X |
| 3,240,699 | 3/1966 | Duff et al. | 210—190 X |
| 595,182 | 12/1897 | Brent et al. | 210—279 X |
| 2,670,328 | 2/1954 | Webb | 210—140 |
| 2,863,559 | 12/1958 | Schulze | 210—191 X |
| 3,049,237 | 8/1962 | Whitlock et al. | 210—136 |
| 3,073,346 | 1/1963 | Rudelick | 210—140 X |
| 3,113,101 | 12/1963 | Brown | 210—190 X |
| 3,183,933 | 5/1965 | Whitlock et al. | 210—191 X |
| 3,228,416 | 1/1966 | Prosser et al. | 210—191 X |
| 3,237,640 | 1/1966 | Whitlock et al. | 137—625 X |
| 3,239,063 | 3/1966 | Lamkin | 210—190 X |

REUBEN FRIEDMAN, *Primary Examiner.*

F. SPEAR, *Assistant Examiner.*